United States Patent [19]

Bainbridge et al.

[11] Patent Number: 5,612,405
[45] Date of Patent: Mar. 18, 1997

[54] GLASS FIBER BINDING COMPOSITION CONTAINING LATEX ELASTOMER AND METHOD OF REDUCING FALLOUT FROM GLASS FIBER COMPOSITIONS

[75] Inventors: David W. Bainbridge, Littleton; James W. Stacy, Castle Rock; Mario P. Tocci, Littleton, all of Colo.

[73] Assignee: Schuller International, Inc., Denver, Colo.

[21] Appl. No.: 427,989

[22] Filed: Apr. 24, 1995

Related U.S. Application Data

[63] Continuation of Ser. No. 949,442, Sep. 22, 1992, abandoned.

[51] Int. Cl.⁶ .................................................. C08K 3/20
[52] U.S. Cl. .................. 524/510; 524/494; 524/511; 524/594; 524/596
[58] Field of Search .................. 524/510, 511, 524/494, 594, 596

[56] References Cited

U.S. PATENT DOCUMENTS

| | | |
|---|---|---|
| 2,723,209 | 11/1955 | Phillips . |
| 3,567,671 | 3/1971 | Janetos .................................. 260/28.5 |
| 3,876,405 | 4/1975 | Eilerman ...................................... 65/3 |
| 3,914,192 | 10/1975 | Flautt et al. . |
| 4,006,272 | 2/1977 | Sakaguchi et al. . |
| 4,060,504 | 11/1977 | Higginbottom . |
| 4,087,267 | 5/1978 | Goutte et al. .................................. 65/5 |
| 4,258,098 | 3/1981 | Bondoc et al. ........................ 428/288 |
| 4,277,535 | 7/1981 | Girgis ..................................... 428/389 |
| 4,397,756 | 8/1983 | Lehmann et al. ......................... 524/21 |
| 4,560,612 | 12/1985 | Yau . |
| 4,751,134 | 6/1988 | Chenowath et al. . |
| 4,757,108 | 7/1988 | Walisser . |
| 4,849,281 | 7/1989 | Brandon et al. . |
| 4,888,235 | 12/1989 | Chenoweth et al. . |
| 4,889,764 | 12/1989 | Chenoweth et al. . |
| 4,892,695 | 1/1990 | Bainbridge et al. . |
| 4,946,738 | 8/1990 | Chenoweth et al. . |
| 4,960,826 | 10/1990 | Walisser et al. . |
| 5,143,954 | 9/1992 | Hutton et al. ............................ 524/106 |
| 5,358,748 | 10/1994 | Mathews et al. ..................... 427/389.8 |

*Primary Examiner*—Edward J. Cain
*Attorney, Agent, or Firm*—Cornelius P. Quinn

[57] ABSTRACT

Described is an aqueous sprayable glass fiber binding composition comprising: a) an aqueous compatible formaldehyde thermosetting coating composition; and b) a compatible aqueous latex elastomeric composition. Also described are binder compositions that decrease fallout of glass fiber and binder from the coated glass fiber. Also disclosed is a glass fiber binder composition having low odor content.

26 Claims, 3 Drawing Sheets

GLASS FIBER BINDING COMPOSITION CONTAINING LATEX ELASTOMER AND METHOD OF REDUCING FALLOUT FROM GLASS FIBER COMPOSITIONS

This is a continuation of application Ser. No. 07/949,442 filed on Sep. 22, 1992, now abandoned.

TECHNICAL FIELD

This invention relates to aqueous glass fiber binder compositions and reduced fallout from glass fiber compositions. By "fallout", it is meant glass fibers and/or binder that comprises the dust that results from the handling of glass fiber compositions during use.

BACKGROUND ART

Fiberglass comes in many shapes and sizes and can be used for a variety of applications. A general discussion of glass fiber technology is provided in "Fiberglass" by J. Gilbert Mohr and William P. Rowe, Van Nostrand Reinhold Co., New York, 1978, which is hereby incorporated by reference. Water soluble phenolformaldehyde resins such as resoles have been known for a number of years. See, for example, U.S. Pat. Nos. 4,060,504, 4,757,108 and 4,960,826, hereby incorporated by reference.

A number of references disclose mats that are comprised of short siliceous materials such as chopped glass fiber from a continuous filament glass fibers. These fibers are extremely short in length, namely one-half inch and less. The glass materials may also be obtained by chopping other glass fibers to obtain short length siliceous materials. U.S. Pat. No. 2,723,209 describes such mats utilizing a binder formulation of acrylonitrile-butadiene copolymer. To this is added a phenolic resin solution which is then further diluted with water so that the solids content is approximately 2%. A small amount of this mixture is sprayed onto a glass fiber mat and an excessive amount is later poured onto a roller over which the wetted mat travels. The impregnated mat then passes over concentrated heat of direct fired or radiant burners and then into a baking oven at a temperature of 250° to 400° F. for 10 to 25 minutes. The mat with the resin material thereon is fully cured. Mats comprised of a bed of glass fibers are to be treated as a sheet so that it can be impregnated. Utilization of resinous materials for such compositions are primarily for complete support of the overall structure. This technique is sharply contrasted with the present invention which is concerned with binders that are to be applied to glass fibers after the fiber is formed by different techniques.

Another glass fiber mat reference is U.S. Pat. No. 4,006,272 which pertains to a process for preparing resin impregnated glass fiber mats in which the binder resin has a high rate of dissolution in vinyl monomers. The binder resin is a styrene resin or copolymer composed mainly of styrene. Blended with the styrene may also be unsaturated polyester resin having a melting point of 80° to 130° C.

U.S. Pat. No. 4,258,098 pertains to a glass fiber mat which utilizes a urea formaldehyde resin together with styrene butadiene latex copolymer further containing 0.1 to 5% by weight acrylamide, methacrylamide, N-methylolacrylamide or N-methylolmethacrylamide. Another glass fiber mat document is U.S. Pat. No. 4,560,612 which has a binder composition of urea formaldehyde, styrene-butadiene latex copolymer and a fully methylated melamine-formaldehyde copolymer.

Another glass fiber mat is disclosed in U.S. Pat. No. 4,849,281 where the mat has a particular unique blend of glass fibers such as wool fibers and textile glass fibers together with melamine cross-linked styrene butadiene resin.

U.S. Pat. No. 4,892,695 discloses a fiber glass mat containing glass fibers, polyolefin fibers and polyamide fibers together with a latex binder such as styrene-butadiene latex.

U.S. Pat. No. 3,914,192 discloses for use as reinforcement for elastomeric materials a plurality of glass fibers, a thin film coating on the surface of the glass fibers and an impregnant in the bundle, the impregnant comprising a blend of resorcinol aldehyde resin and an elastomer.

It is an object of the present invention to have an improved glass fiber binding composition utilizing the combination of aqueous latex and a thermosetting composition. The binder coats the entire fiber as well as the juncture points. In the prior art, binders with a formaldehyde thermosetting composition are designed to coat and/or migrate to the glass fiber juncture points not to coat individual fibers.

It is an object of the present invention to obtain glass fiber compositions of improved handleability and reduced fiber "fallout" in the use of the glass fiber compositions. Prior to the present invention, handlers of fibrous glass products vigorously complained about the handleability and skin irritation they receive.

It is an object of the present invention to obtain glass fiber compositions in their fully cured state that have low odor associated with such cured glass fiber compositions.

SUMMARY OF THE INVENTION

Described is an aqueous sprayable glass fiber binding composition comprising:

a. an aqueous compatible formaldehyde thermosetting coating composition; and b. a compatible aqueous latex elastomeric composition.

Another embodiment of the invention is the utilization of an acrylic latex composition used in conjunction with the elastomeric composition.

Another embodiment of the invention pertains to a method of reducing fiber fallout and/or irritation by applying the aforementioned aqueous compatible binder composition to newly formed glass fibers and curing the binder composition.

Another embodiment of the invention is to decrease the odor of cured glass fiber composition comprising the steps of:

a. providing newly formed glass fibers;

b. applying the aforementioned glass fiber binding composition; and c. curing the resin wherein the cured composition has an alkylamine content of less than 100 ppm.

Also described is a curable, e.g. A-stage or B-stage, glass fiber composition containing glass fibers having the aforementioned binder composition applied thereto wherein the B-stage cured glass fiber composition has an alkylamine content of less than 100 ppm.

Also described is a C-staged cured glass fiber composition containing glass fibers having the aforementioned binder composition applied thereto wherein the C-staged cured glass fiber composition has an alkylamine content of less than 100 ppm.

DESCRIPTION OF PREFERRED EMBODIMENTS

The binder compositions in the present invention utilizes elastomer aqueous emulsions compatible with thermosetting formaldehyde containing resins. Application of the binder compositions will be to newly formed glass fibers using known prior art fiber manufacturing methods. The binder will be applied to the newly formed glass fibers mid-air prior to their collection using normal known manufacturing techniques. Further note that during the application of the inventive binder the glass is collected on a permeable chain or webbing to form a blanket of fibrous glass with the wet or uncured inventive binder coating each fiber making up the blanket. No excess binder need be applied nor drawn off. The blanket has normal thickness of one (1) to twelve (12) inches but can be made to almost any thickness desired. In this state, the blanket is wet or A stage and the inventive binder is uncured. The blanket can now be distributed to customers as is or dimensionally sized by heated rollers and cured in an oven or the uncured blanket can be placed into molds to be formed into various configurations. An example of a blanket which has been sized by heated rollers and then cured out in an oven would be home insulation. The blanket fiber glass material thus should have the properties of being low density with a high thermal resistance or R value.

The glass fiber which makes up this blanket has various fiber diameters and lengths dependent on the fiber forming equipment and process. For example, in a pot and marble process or flame attenuated process, the burner flame temperature will help determine fiber diameter and length of fiber. As another example, the diameter of the semi molten glass strand being pulled from a high temperature crucible during the manufacturing process will also effect the diameter and length of the newly formed glass fibers. The majority of glass fibers formed by this process will fall into the diameter range of 3 to 20 microns.

A fiber glass mat utilizes glass fibers with identical fiber diameters cut to a predetermined length. The length of the fiber is important in the mat forming process because the fibers may not be much more than three (3) inches in length to be used successfully in the mat forming process. Fibers with lengths in excess of three (3) inches will fold over or become entangled with each other causing a bunching or lump in the mat.

When forming a blanket, fiber length is also very important to the strength of the blanket. The mean fiber length is much longer than three (3) inches for the products manufactured from this blanket to have the desired strength. Fiber lengths up to twelve (12) inches can be expected in the blanket.

The present invention is concerned with glass fiber binder compositions. Any technique for the manufacture of glass fibers is satisfactory. While not a complete listing of all glass fiber manufacturing techniques, some of the fiberization manufacturing techniques can be described as the pot and marble process or the flame attenuated process, and the rotary processes. In the rotary process, the glass melt is formed and the glass is passed through spinnerettes with calibrated perforations thereby forming the glass fiber. A flame attenuation process utilizes a technique whereby the fibers are formed from primary filaments being drawn through calibrated perforations from the bottoms of high temperature crucibles called pots. One process rolls molten glass into marbles so that the glass can be transferred or fed more readily into the manufacturing processes. This is called the Pot and Marble process. See the book "Glass Fibers" by J. Gilert Mohr and William P. Rowe, Van Nostrand, Reinhold Company, published in 1978. The book describes numerous fiberizing techniques at pp. 4–16, hereby incorporated by reference.

In each of the fiberizing techniques, newly formed glass fibers are warm. The glass fibers then have an aqueous binder applied thereto to bind the junctions of the glass fibers. It is to be appreciated that the glass fibers to which this invention is directed can also include glass fibers other than recently formed glass fibers.

Application of the binder compositions will be to newly formed glass fibers in mid-air prior to their collection using normal known manufacturing techniques.

The binder compositions in the present invention utilize thermosettable aqueous compatible formaldehyde containing compositions. The formaldehyde containing compositions are well known, commercially available materials. Low phenol formaldehyde resins are commercially available such as from Borden Chemical of Columbus, Ohio identified as IB746B. A broad listing of phenol formaldehyde resins are described in U.S. Pat. Nos. 4,257,108 and 4,960,826, hereby incorporated by reference. Other thermosetting compositions that may be utilized are urea formaldehyde compositions; resorcinolformaldehyde resins or other polyhydric phenol or cresol thermosetting compositions. It is to be appreciated that such resins may be modified with methylol groups which upon curing form methylene or ether linkages. Such methylols include N,N'-dimethylol, dihydroxymethlolethylene, N,N'-bis (methoxy methyl), N,N'dimethylolpropylene, 5,5-dimethyl-N,N'-dimethylol propylene, N,N'-dimethylol ethylene, and the like.

The aqueous compatible latex composition that is utilized in the present case is an elastomeric containing material. Suitable elastomeric latex materials are olefin based elastomers such as olefin based rubbers, such as butadiene polymers, such as styrene butadiene and the like, EPM (ethylene propylene monomer as a copolymer), EPDM (ethylene propylene-diene terpolymer), ethylene-butene-1 copolymer rubber, carboxylated styrene-butadiene latex and the like. The most preferred material is a carboxylated styrene-butadiene latex having a glass transition temperature of $-15°$ C., a viscosity at ambient of 700 centipoise available under the mark TYLAC-97834 (trademark of Reichhold of Dover, Del.). The 97834 has typical properties of 53% nonvolatiles with a pH of 8.5 with a Brookfield viscosity of (#3 spindle at 60 rpm) 700 with an emulsifier type that is anionic.

To improve strength to the glass fibers matrix, it is desirable to add an additional component to the glass fiber binding composition, namely, an acrylic polymer. The acrylic material likewise adds water resistance. It preferably has a glass transition temperature that is greater than 0 to about 50, preferably about 350° C. A wide variety of acrylic latexes are available such as those comprised of polymers or copolymers of acrylic acid, methacrylic acid, acrylic or methacrylic acid esters of from 1 to 4 carbon atoms, acrylamide polymers or copolymers and esters thereof of from 1 to 4 carbon atoms. Suitable acrylic materials are available from Rohm & Haas under the mark RHOPLEX, preferably RHOPLEX-R GL-618 emulsion which has 46% to 48% acrylic copolymer by weight, formaldehyde of 0.05% with 52% to 54% water having a pH of 7.5 to 9.8 with a viscosity of 50 to 200 centipoise.

It has likewise been found desirable to add a formaldehyde scavenger. While a wide variety of scavengers are available, it is preferred that an aqueous compatible latex be employed preferably a vinyl containing material such as aromatic or aliphatic vinyl such as vinyl chloride polymeric compositions. Suitable vinyl chloride copolymers are available from the trade such as from B.F. Goodrich under the mark GEON. Most preferably, the GEON material is GEON TN801 which has a glass transition temperature of 65° C. The PVC containing material is also useful for stiffening purposes.

It is to be appreciated that thermosetting composition preferably employs a catalyst for the curing of the thermosetting composition. Any well known catalyst can be used such as melamine formaldehyde, CYMEL resins, preferably CYMEL-303 resin which is a modified melamine formaldehyde resin. Any of the commercially available amino resins for cross-linking purposes may be utilized.

For utilization of additional phenol formaldehyde resins that have low free formaldehyde and formaldehyde scavengers, see the compositions described in applicant's assignee's co-pending application filed on May 19, 1992, Ser. No. 886,666. Formaldehyde scavengers that are utilized are nitrogen heterocyclic materials having a replaceable hydrogen attached to an amine of the compound such as amino triazines such as melamine, guanamine, benzol guanamine, and the like. Other formaldehyde scavengers may be utilized such as guanidine, dicyandiamide, and the like.

The aqueous binder compositions of the present invention are preferably described below in Table I.

TABLE I

| Composition % By Weight | Range % By Weight | Preferred Range % By weight |
| --- | --- | --- |
| Thermosetting Formaldehyde Resin (46% nonvolatiles) | 10–50% | 40% |
| Latex Elastomer (53% nonvolatiles) | 20–80% | 37% |
| Acrylic Latex (46% nonvolatiles) | 0–30% preferably 10–30% | 17% |
| Formaldehyde Scavenger (51% nonvolatiles) | 0–30% preferably 1–30% | 5% |
| Cross-Linking Catalyst | 0–5% preferably 1–5% | 1% |
| | 100% | 100% |

It is to be appreciated that the aforementioned compositions are to be blended with water where the water content ranges from about 50–98% by weight with the remainder being the aforementioned binder composition with the total being 100% by weight.

Delivery of the binder to the formed glass fibers in such processes may be achieved via the use of standard spray systems, column expanders, or alternatively, conventional air assisted spray equipment. One type of air assisted spray equipment is described in U.S. Pat. No. 4,832,723, issued May 23, 1989 to Shisler et al., which is incorporated by reference.

Most preferably, the newly formed glass fibers with a binder sprayed thereon are collected on a moving chain as a loose blanket. The blanket may be pulled into heated tools for molding, coiled up onto mandrels or pulled between heated rollers to achieve desired blanket thickness and density wherein the blanket is partially compressed before being fully cured or C stage. To provide the blanket with enough tensile strength to be pulled into or onto various manufacturing processes, the binder should provide enough strength to the uncured blanket. The uncured binder should be tacky enough to hold the glass fibers together. This is why present art concerns itself only with binders capable of coating fiber juncture points and not the entire fiber. To coat the entire fiber was deemed unnecessary and wasteful for prior art binder compositions. With the inventive binder, the juncture points should be coated for wet tensile strength via the tacky thermoset resins and the glass fibers should be coated for reducing fall out and irritation via the thermoplastic elastomer latex emulsions. The entire glass fiber should be coated to reduce fall out because the glass fibers are very brittle and when they break during handling, the "rubber" latex coating holds the fiber together and prevents fiber splintering.

This explains in part why the inventive binder is a combination of tacky thermoset resins in combination with compatible latex emulsions. Thermoset resins should also be used to provide adequate strength to the fibrous glass products at elevated temperatures. Latex resins alone were much too weak to be used as a binder. There simply was no strength to the fiber glass parts, specifically, automotive hoodliners and headliners. Parts made from the inventive composition should be comparable to the strength of parts made from the standard binder compositions. Thus, these parts should have enough tensile, flexure and internal bond strength. The invention has solved this problem by its unique composition.

After the application of the binder composition to the glass fibers, it may be sold as-is, i.e., in the uncured unit state, namely, A-stage. Also, there may be a partial curing of what is called the B-stage product. By this is meant that the glass fiber composition has much of the water removed from the blanket. The B-stage product facilitates handling and shipping of the glass fiber blanket, and the like.

The final cured compositions or C-stage take on an innumerable number of forms as desired by the end user. Suitable C-stage configurations for glass fiber compositions of the present invention include vehicular interior trim including headliners, dash insulators, HVAC (heating ventilation air conditioning) insulators, hood insulators, duct wrap, duct board, duct liner, air filtration, and other desirable C-stage compositions. Generally, the desired shape occurs by a molding technique.

The curing of the glass fiber composition with a binder applied thereto as described herein is generally very quick depending upon the temperature and time desired. Generally, the temperature ranges from about 500° to about 550° F. with a period of time of less than 5 minutes, preferably from 10 seconds to 2 minutes, and even more preferably 20 seconds to 90 seconds such as for automotive headliners or hoodliners. Presently, automotive headliners and hoodliners require elevated molding temperatures to have cure cycle times competitive to non-fiber glass headliners and hoodliners. The inventive binder provides the same cure cycle process time with much lower molding temperatures. For example, a hoodliner containing the standard thermoset resins will have a cure cycle time of 20 seconds when mold temperatures are 650° F. When using the inventive binder mold, temperatures can be reduced to 425° F. Mold temperatures of 650° F. are too hot for aluminum tools thus manufacturers are forced to use steel tools at a much greater expense. Manufacturers of automotive headliners and hoodliners may now use aluminum tools instead of steel tools.

Another problem is encountered using temperatures in excess of 475° F. when manufacturing headliners or hoodliners. Headliners and hoodliners are usually faced by a non-woven mat weighing between 0.5 ounces to 2 ounces per square yard to encapsulate the automotive glass product and/or to make the product more attractive. The non-woven mat is made from rayon and polyester fibers. The mat degrades at elevated tool temperatures above 475° F. The inventive binder will resolve this problem.

It has also been found desirable to add to the binding composition as desired, silicon containing materials which decrease the moisture absorption of the resin. A suitable material is a silane. It assists in the coupling of the polymer to the glass fiber. A preferred material is Union Carbide 1101 which is an amino functional silane.

In order to detect the alkyl amine, suitable analytical testing is permissible. A technique is to subject the final cured product to high temperature of about 125° F. and 95% relative humidity for a desired period of time such as 3 hours and thereby detect the presence of the alkyl amine. The composite density of the final product can range up to about 20 pounds per cubic foot (PCF), preferably 1 to about 15 PCF. The most undesirable alkyl amine that causes odor in the composition is trimethyl amine.

It is to be appreciated that the amount of binder that is applied to the glass fiber is preferably of a nature to completely coat the glass fiber, as well as to give a binding at the junction of the glass fibers. The final cured product therefore can be characterized as having a binder on the glass composition as a maximum of 30% loss on ignition (LOI), preferably 16% LOI.

Listed below are exemplifications of preferred embodiments of the invention wherein all parts are parts by weight and all temperatures are in degrees Centigrade, unless otherwise indicated.

EXAMPLE 1

The binder tested was labeled as "IMP" and had the following composition:
a) 48% by weight 97834 latex manufactured by Reichhold Chemicals, Inc.

The latex is a carboxylated butadiene-styrene which has the following properties:

| | |
|---|---|
| Nonvolatiles, % | 53% |
| pH | 8.5 +/− 0.5 |
| Emulsifier type | Anionic |
| Glass Transition Temperature | −15° C. |
| Appearance | White |
| Odor | Slight ammonical | b) 40% by weight phenol formaldehyde binder prepared from a resin mixture as follows:

825 g phenol formaldehyde resin (46.5% by weight solids: Georgia Pacific GP 2804)

| | |
|---|---|
| 96 g | urea |
| 9.6 g | ammonium sulfate |
| 96 g | ammonia (pH adjustment to neutral) |
| 0.96 g | silane |
| 168 g | distilled water | c) 12% 911-138-018 latex binder manufactured by B.F. Goodrich.

The B.F. Goodrich latex is a polyvinyl chloride copolymer and has the following properties:

| | |
|---|---|
| Nonvolatiles, % | 53% |
| pH | 5.7 +/− 0.5 |
| Emulsifier type | Anionic |
| Glass Transition Temperature | 65° C. |
| Appearance | White |
| Odor | Polymer |

Tensile Strength

The first strength test performed was the ASTM D751 tensile strength test. The machine parameters for all samples were as follows:

| | |
|---|---|
| Sample rate (Pts/sec): | 9.10 |
| Crosshead Speed (in/min): | 12.0 |
| Humidity (%) | 50 |
| Temperature °F. | 73 |

Figure 1:
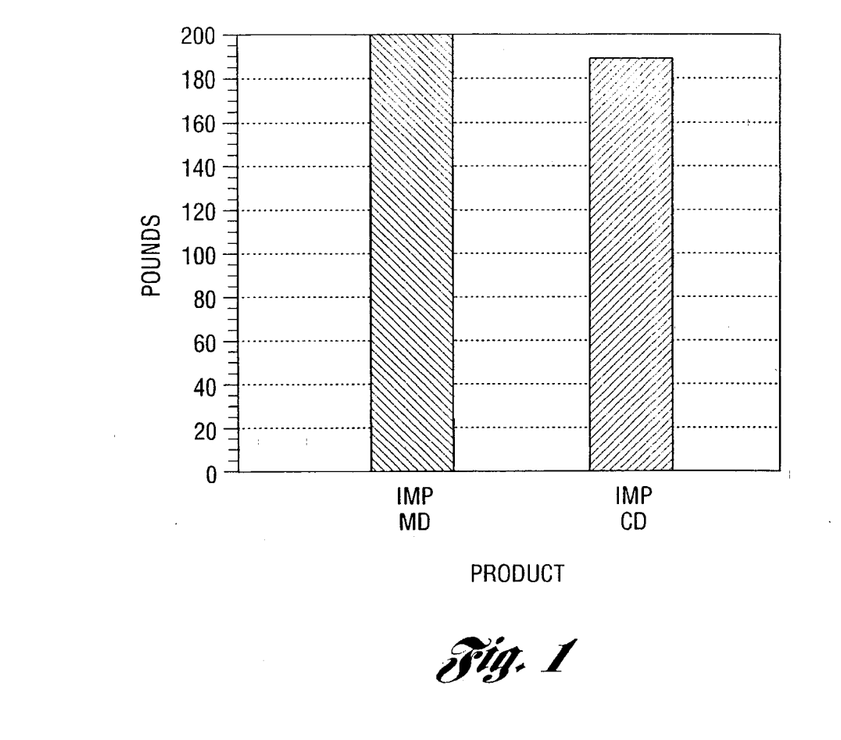
FIG. 1 is a chart of tensile strength of the products of the present invention in pounds.

Ten samples of each material were prepared for testing. Five were tested in the machine direction ("MD") and five were tested in the cross machine direction ("CM"). The tensile strength mean of each group is shown in FIG. 1. FIG. 1 shows the calculated tensile strengths of each material tested in machine direction ("MD") and cross machine direction ("CM") in pounds. Each sample studied had the following dimensions:

| | |
|---|---|
| Thickness (in): | 0.25 |
| Width (in): | 4.0 |
| Gauge Length (in): | 3.0 |
| Specimen Gauge Length (in): | 3.0 |
| Weight per square foot (gr.) | 76 |

Table II shows the results from tensile strength test ASTM D751 using standard glass fiber wool, machine direction. Out of five specimens, zero were excluded.

TABLE II

| Specimen Number | Load at Maximum Load (lbs.) |
|---|---|
| 1 | 212.5 |
| 2 | 220.7 |
| 3 | 219.9 |
| 4 | 198.2 |
| 5 | 232.8 |

Mean: 216.8
Standard Deviation: 12.7
Minimum: 198.2
Maximum: 232.8

Table III shows the results from tensile strength test ASTM D751 using standard glass fiber wool, cross machine direction. Out of five specimens, zero were excluded.

TABLE III

| Specimen Number | Load at Maximum Load (lbs.) |
|---|---|
| 1 | 259.0 |
| 2 | 284.5 |
| 3 | 321.6 |
| 4 | 244.5 |
| 5 | 248.2 |

Mean: 271.6
Standard Deviation: 32.1
Minimum: 244.5
Maximum: 321.6

Flexure Strength

The second test conducted on the inventive product was a three point flexure strength test. The machine parameters for all samples were as follows:

| | |
|---|---|
| Sample rate (Pts/sec): | 9.10 |
| Crosshead Speed (in/min): | 1.0 |
| Humidity (%) | 50 |
| Temperature °F. | 73 |

Figure 2:
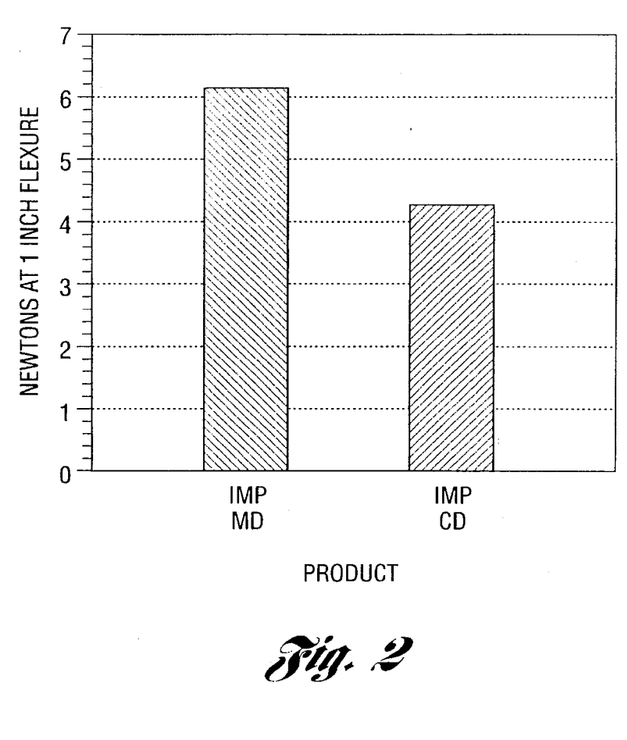
FIG. 2 is a chart of flexural strength of the products of the present invention in newtons.
Figure 3:
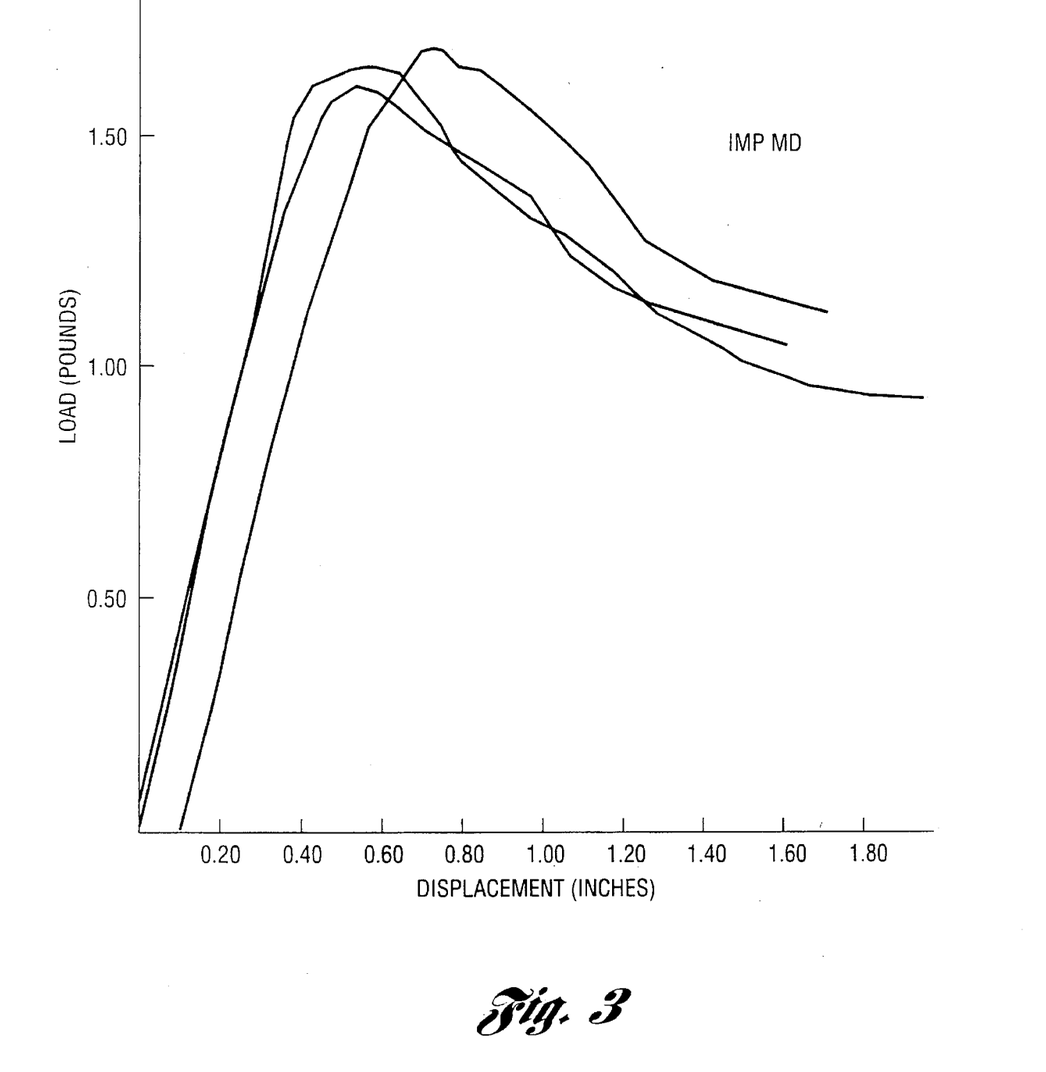
FIGS. 3 and 4 are graphs of the flexural strength properties of the present invention.
Figure 4:
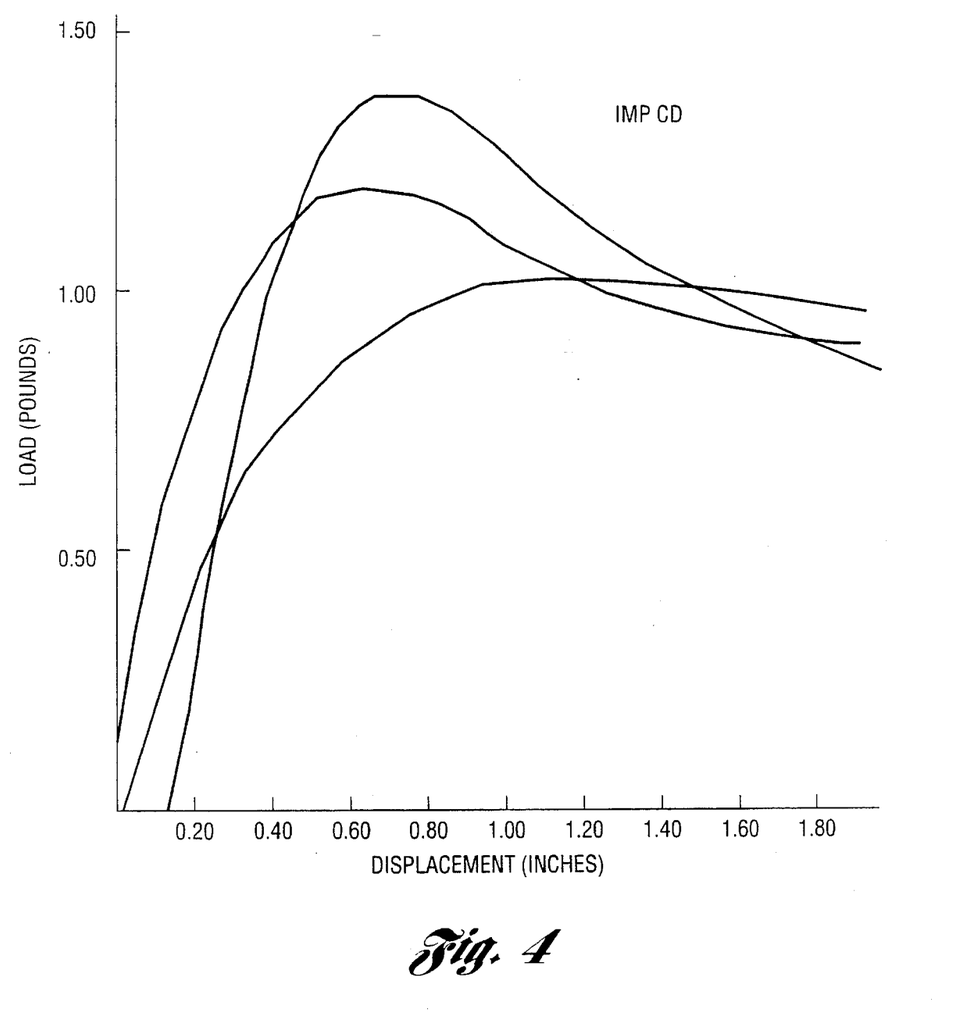

The flexural strength means of each group is shown in FIG. 2. FIG. 2 shows the calculated flexure strengths of material tested in machine direction and cross machine direction in newtons. The standard samples were very anisotropic which can be seen by reviewing FIGS. 3 and 4. The IMP binder provides a more uniform material. This was an unexpected result and provides the manufacturer greater flexibility when designing new parts. The flexure strength was determined adequate but another unexpected benefit when installing the automotive hoodliners was noted. The hoodliner parts flexed instead of breaking during installation.

EXAMPLE 2

Using the binder composition of Example 1, additional testing was performed. Table IV shows a dramatic improvement in fall out weight when the inventive glass composition is tested using a simulated handling test. These samples were initially produced in blanket form then compressed and cured to flat sheets 0.25 inch in thickness. Then cut into 3×3 inch squares and mounted into a special jig which scrapes the edge of each sample identically to simulate human handling. Glass fiber and binder fall out was collected and weighed. All samples had identical weights and densities. The data shown in Table IV are averages collected from 9 test samples of the material.

TABLE IV

| Sample | Weight Of All Fall Out Micrograms |
|---|---|
| IMP | 0.309 |

It is an object of the present invention to obtain glass fiber compositions in their fully cured state that have low odor associated with such cured glass fiber compositions. Many thermosetting binders have high formaldehyde emissions when cured at elevated temperatures. The formaldehyde in itself is an irritant and a potential toxic agent but does combine with other free radicals into compounds having distinct and unfavorable odor to people. An example of such a compound is trimethylamine. The present invention eliminates much of the thermosetting binder and replaces it with aqueous latex emulsions. The latex emulsions release very little free formaldehyde. Thus, much of the odor otherwise caused by the free formaldehyde is reduced or eliminated.

Table V shows the decreased formaldehyde content of the present invention. The values shown in the chart are averages of micrograms formaldehyde per dry gram of resin which is equivalent to parts per million.

TABLE V

| Resin | Micrograms Formaldehyde Per Dry Dram Of Resin |
|---|---|
| IMP | 167 |

EXAMPLE 3

The glass fiber composition described below was sprayed at 5% by weight solids in water onto newly formed glass fibers. The composition of the glass fibers was generally commercially available glass fibers having the approximate composition as follows:

| Oxide | % By Weight |
|---|---|
| $SiO_2$ | 63.8 |
| $Al_2O_3$ | 4.6 |
| $B_2O_3$ | 6.0 |
| $Na_2O$ | 16.2 |
| $K_2O$ | 1.0 |
| CaO | 4.6 |
| MgO | 3.2 |
| Trace amounts | 0.6 |

The glass fibers had a softening point of 1264° F., a density of about 2.5 g/cc with a liquidus temperature of 1300° F. (maximum). The coated glass fibers were cured at approximately 500° F. The fiberglass product was then subjected to various tests. The glass fiber binder composition that was sprayed onto the glass fibers is the most preferred composition in Table I.

Mass/Unit

Mass/Unit area for glass fibers (ASTM D751). Tolerance of +/− 15% (76 gram material).
Samples: (1) 35 mm×305 mm or 12"×12"
Test Equipment: AND Electronic Digital Balance Model Number EP-12KB
Results: 85 grams—112% (including facing)
Conclusion: Pass

Tensile Strength

Tensile Strength (ASTM D751, Grab Method glass fiber blanket only). Minimum of 22N, machine and against machine direction, when using a 25×75 mm jaw front and back.
Sample: Specimen 100 mm (4") in width and not less than 150 mm (6") in length.
Test Equipment: Instron model 1130 Universal Testing Instrument with 100 lb. load cell.
Results as follows:
  Longitudinal: 5 samples all 444 Newton+
  Transverse: 4 samples 444 Newtons+ 1 sample 422 Newtons

Bond Strength

Automotive headliners require a knap knit nylon cloth to be added to the top surface of the headliner. For this reason, a bond adhesion test is done to test the glass to foam adhesion.

Bond strength facing to glass fiber (ASTM D751, 305 mm/minute). 0.5N minimum
Sample: Molded fiberglass samples, faced, cut 50 mm×250 mm.
Test Equipment: Instron model 1130 Universal Testing Instrument with 100 lb. load cell.
Results: 2.2N to 6.5N
Conclusion: Pass

Internal Bond Strength

Automotive headliners and hoodliners should not internally delaminate. Thus, an Internal Bond Strength test should be passed. Internal Bond Strength of glass fiber (GM9193P, 300 mm/min.) 3N minimum.

Internal Bond Strength of glass fiber (GM9193P, 300 mm/min.) 3N minimum
Samples: (5) molded fiberglass samples, faced front and back, cut 125 mm×125 mm.
Test Equipment: Chatillon Pull Tester #IN-25
Results:
53.3 Newtons
82.0 Newtons
62.2 Newtons
53.3 Newtons
84.5 Newtons

Immersion

Automotive headliners and hoodliners should pass an immersion test.

The material shall be immersed for 2 hours in water at 95° C.+/−5° C. (no rapid boiling) without any evidence of binder breakdown. Slight color bleed in the water is acceptable and not cause for rejection.
Sample: 30 mm×30 mm cured black fiberglass
Test Equipment: Hot plate, thermometer in Centigrade, beaker, and water.
Results: No binder breakdown, slight color bleed
Conclusion: Pass

Trimethylamine 50 parts per million were detected.

The testing technique utilized to determine the trimethylamine was as follows:

The equipment that was utilized, as well as the reagents, are as follows:

Wide mouth glass quart jars with screw cap (Mason Jar);
Crimp seal sample vials (approximately 4.0 ml);
Convection oven capable of maintaining 38° C.±2° C.;
Gas Chromatograph with Flame Ionization Detector;
Stock TMA solution, 1000 ppm—Weight 0.163 g of Trimethylamine Hydrochloride into a 100 ml volumetric flask and dilute to 100 ml with distilled water;
2 normal sodium hydroxide; and
Acetone, chromatography grade.

The test procedure is as follows:
Weight 10.00±0.02 grams boiled distilled water into a glass quart jar containing a 6.5 centimeter tall sample support (open ended 100 milliliter plastic tricornered polypropylene beaker with corners clipped and out to 6.5 centimeter height). Place an 8.9 centimeter diameter disk (cut from non-absorbing plastic open mesh sink matting) on top of the sample support. Evenly distribute 12.00±0.10 grams of well mixed cubed insulation into jar above the sample support. Cubes should be approximately 1"×1". Screw the lid over a piece of clear polyethylene film to seal each jar. Place jars in a convection oven set at 38° C.±2° C. over 16 hours. Remove jars from oven and cool to room temperatures.

The sample analysis is as follows:
Add 1.71 ml of water from mason jar to a crimp seal sample vial. Add 0.09 ml of 2 Normal NaOH containing 0.02% v/v Acetone and seal sample vial. Use injection volume of 2 microliters. Make calibration curve from 1, 4, 10, 20, 80 ppm TMA solutions prepared from 1000 ppm solution.

| G-C Conditions | |
| --- | --- |
| 1. Machine: | HP-5890 with FID |
| 2. Column: | Wide bore capillary column |
| | 30 meter DB Wax |
| | J&W Scientific |
| | Folsom, CA |
| | 1 micron film, 0.53 mm diameter |
| 3. Carrier Gas: | 11 ml/min Helium |
| 4. Program: | Injector temp. 180° C. |
| | Detector temp. 240° C. |
| | 35° C. for 5 min. |
| | 15° C./min. to 180° C. |
| | 180° C. for 10 min. |

With respect to results, report trimethylamine as micrograms of TMA in water based on sample weight (microgram/gram) of fiber glass.

While the forms of the invention herein disclosed constitute presently preferred embodiments, many others are possible. It is not intended herein to mention all of the possible equivalent forms or ramifications of the invention. it is understood that terms used herein are merely descriptive rather than limiting, and that various changes may be made without departing from the spirit or scope of the invention.

An example could be the use of a standard commercially available phenol formaldehyde resin in conjunction with a latex elastomer in the % by weight shown in Table I without additional resinous components in the binder composition.

What is claimed is:
1. A process for the preparation of binder-coated glass fiber mat or blanket products having reduced fiber fallout, comprising:
   a) providing newly formed discontinuous glass fibers;
   b) spraying said glass fibers in mid-air prior to collection with a binding effective amount of a sprayable aqueous binding composition comprising:
      i) an aqueous compatible phenol formaldehyde resin in an amount of from about 4.6 weight percent to about 23 weight percent,
      ii) an aqueous compatible elastomeric latex in an amount of from about 10.6 weight percent to about 45 weight percent,
      iii) an effective amount of a nitrogenous formaldehyde scavenger,
      iv) balance water; and c) collecting binder coated fibers as a random mat or blanket wherein the total solids content of the aqueous binding composition is from about 2 weight percent to about 50 weight percent, and wherein said weight percents are weight percent solids relative to total aqueous binding composition weight.

2. The process of claim 1 wherein said nitrogenous formaldehyde scavenger is selected from the group consisting of urea, melamine, dicyandiamide, and mixtures thereof.

3. The process of claim 1 wherein said formaldehyde scavenger is present in an amount of from 0.5 weight percent to about 15 weight percent based on formaldehyde scavenger solids relative to total aqueous binding composition weight.

4. The process of claim 1 wherein said phenol formaldehyde resin is present in an amount of about 18 weight percent, said elastomeric latex is present in an amount of about 20 weight percent, and said formaldehyde scavenger is present in an amount of about 3 weight percent.

5. The process of claim 1 wherein said aqueous binding composition further comprises about 4.6 weight percent to about 14 weight percent, based on solids, of an acrylic latex, the acrylic polymer of which has a glass transition temperature of between about 0° C. and about 50° C.

6. The process of claim 1 wherein said aqueous compatible elastomeric latex is a latex of a carboxylated styrene butadiene polymer having a glass transition temperature of about −15° C.

7. The process of claim 1 further comprising:
d) heating said mat or blanket obtained in step c) to form a B-staged fiberglass mat or blanket product.

8. The process of claim 1 further comprising:
e) curing said mat or blanket to form a C-staged mat or blanket.

9. The process of claim 7 further comprising:
f) heating said B-staged mat or blanket obtained in step d) to form a C-staged fiberglass mat or blanket product.

10. A binder coated fiberglass mat or blanket of discontinuous fibers exhibiting reduced fiber fallout, prepared by the process comprising:
a) providing newly formed discontinuous glass fibers;
b) spraying said glass fibers in mid-air prior to collection with a binding effective amount of a sprayable aqueous binding composition comprising:
  i) an aqueous compatible phenol formaldehyde resin in an amount of from about 4.6 weight percent to about 23 weight percent,
  ii) an aqueous compatible elastomeric latex in an amount of from about 10.6 weight percent to about 45 weight percent,
  iii) an effective amount of a nitrogenous formaldehyde scavenger,
  iv) balance water; and
c) collecting binder coated fibers as a random mat or blanket wherein the total solids content of the aqueous binding composition is from about 2 weight percent to about 50 weight percent, and wherein said weight percents are weight percent solids relative to total aqueous binding composition weight.

11. The product of claim 10 wherein said nitrogenous formaldehyde scavenger is selected from the group consisting of urea, melamine, dicyandiamide, and mixtures thereof.

12. The product of claim 10 wherein said formaldehyde scavenger is present in an amount of from 0.5 weight percent to about 15 weight percent based on formaldehyde scavenger solids relative to total aqueous binding composition weight.

13. The product of claim 10 wherein said phenol formaldehyde resin is present in an amount of about 18 weight percent, said elastomeric latex is present in an amount of about 20 weight percent, and said formaldehyde scavenger is present in an amount of about 3 weight percent.

14. The product of claim 10 wherein said aqueous binding composition further comprises about 4.6 weight to about 14 weight percent, based on solids, of an acrylic latex, the acrylic polymer of which has a glass transition temperature of between about 0° C. and about 50° C.

15. The product of claim 10 wherein said aqueous compatible elastomeric latex is a latex of a carboxylated styrene butadiene polymer having a glass transition temperature of about −15° C.

16. The product of claim 10 further comprising:
d) heating said mat or blanket obtained in step c) to form a B-staged fiberglass mat or blanket product.

17. The product of claim 10 further comprising:
e) curing said mat or blanket to form a C-staged mat or blanket.

18. The product of claim 16 further comprising:
f) heating said B-staged mat or blanket obtained in step d) to form a C-staged fiberglass mat or blanket product.

19. The product of claim 10 wherein said nitrogenous formaldehyde scavenger is urea, and said product has an alkyl amine content of less than 100 ppm.

20. A hoodliner or headliner comprising the product of claim 18.

21. A method of reducing fiber fallout from a phenol formaldehyde binder coated discontinuous glass fiber mat or blanket product, comprising:
employing as said phenol formaldehyde binder a binder comprising:
  a) an aqueous compatible phenol formaldehyde resin in an amount of from about 4.6 weight percent to about 23 weight percent;
  b) an aqueous compatible elastomeric latex in an amount of from about 10.6 weight percent to about 45 weight percent;
  c) an effective amount of a nitrogenous formaldehyde scavenger;
  d) balance water, wherein the total solids content of the aqueous binding composition is from about 2 weight percent to about 50 weight percent, and wherein said weight percents are weight percent solids relative to total aqueous binding composition weight.

22. The method of claim 21 wherein said nitrogenous formaldehyde scavenger is selected from the group consisting of urea, melamine, dicyandiamide, and mixtures thereof.

23. A process of binding glass fibers comprising the steps of:
providing newly formed glass fibers;
applying an effective binding amount of an aqueous sprayable compatible binding composition comprising:
  a) an aqueous compatible formaldehyde thermosetting coating composition; and
  b) a compatible aqueous latex elastomeric composition; and
curing the binder onto the glass fibers;
wherein said aqueous sprayable compatible binder composition comprises:

| | |
|---|---|
| Thermosetting Formaldehyde Resin (46% non-volatiles) | 10–40% |
| Latex Elastomer (53% non-volatiles) | 10–30% |
| Acrylic Latex (46% Non-volatiles) | 10–20% |
| Formaldehyde Scavenger (51% non-volatiles) | 1–10% |
| Cross-linking catalyst | 1–5% |
| | 100%. |

24. A method of decreasing fallout from glass fiber compositions comprising the steps:
   providing newly formed glass fibers;
   applying a sprayable glass fiber binding composition comprising:
   a) an aqueous compatible formaldehyde thermosetting coating composition;
   b) a compatible aqueous latex elastomeric composition; and
   c) a compatible acrylic latex composition; and
   curing the resin onto the glass fibers.

25. The method of claim 24 wherein said binder composition comprises, in weight percent relative to the weight of the binder composition,

| | |
|---|---|
| Thermosetting Formaldehyde Resin (46% non-volatiles) | 10–40% |
| Latex Elastomer (53% non-volatiles) | 10–30% |
| Acrylic Latex (46% Non-volatiles) | 10–20% |
| Formaldehyde Scavenger (51% non-volatiles) | 1–10% |
| Cross-linking catalyst | 1–5% |
| | 100%. |

26. The method of claim 25 wherein said thermosetting formaldehyde resin is a phenol formaldehyde composition.

* * * * *